Figure 1:
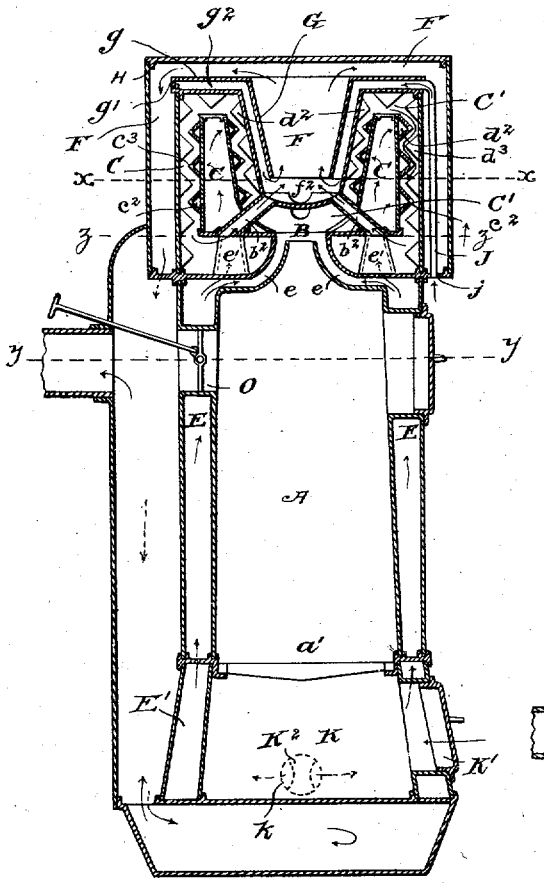

No. 11,908. Reissued May 21, 1901.

F. J. DOYLE.

HEATING DEVICE.

(Application filed Feb. 13, 1901.)

Witnesses,

F. S. Mann,

A. S. Graves

Inventor,

Francis J. Doyle,

By Offield Towler & Lothrop

Attys.

THE NORRIS PETERS CO., WASHINGTON, D. C.

UNITED STATES PATENT OFFICE.

FRANCIS J. DOYLE, OF CHICAGO, ILLINOIS, ASSIGNOR TO THE DOYLE FURNACE COMPANY, OF DENVER, COLORADO.

HEATING DEVICE.

SPECIFICATION forming part of Reissued Letters Patent No. 11,908, dated May 21, 1901.

Original No. 664,932, dated January 1, 1901. Application for reissue filed February 13, 1901. Serial No. 47,122.

*To all whom it may concern:*

Be it known that I, FRANCIS J. DOYLE, of the city of Chicago, county of Cook, and State of Illinois, formerly of Denver, in the State of Colorado, have invented certain new and useful Improvements in Heating Devices, of which the following is a full description.

This invention relates to improvements in heat-generating apparatus, and refers more specifically to an improved heating device wherein the products of combustion derived from the fuel—solid, liquid, or gaseous—pass from a primary combustion-chamber or fire-pot into circulating-passages wherein complete combustion is brought about by the addition of supplies of heated air and the passing of the combustible gases through successively hotter stages.

Among the salient objects of the invention are to provide a construction operating to bring about a more perfect combustion, and consequent greater economy of fuel, by so circulating the products of combustion and so adding thereto fresh supplies of oxygen that a constantly increasing or augmented combustion and hotter temperature are produced, the gases being sufficiently retarded in their passage through the several parts of the device to insure a most complete combustion; to provide a construction wherein the products of combustion from the primary combustion-chamber or fire-pot pass into circulating-passages arranged to extend around and envelop one or more air-heating chambers and are thereafter caused to again pass around the inclosed air-heating chamber or chambers, so as to not only envelop the latter a second time, but to also envelop those parts of the encircling-passage or passages through which the products of combustion perform their first circuit before passing to the exit; to provide in a construction of the character last referred to means for utilizing the heat derived from the primary combustion-chamber or fire-pot for initially heating the supply of air; to provide improvements in the construction and arrangement whereby the supply of air is caused to so circulate that the successive supplies thereof added to the products of combustion are successively of higher temperature; to provide a construction of the character referred to wherein the entire volume of burning gases is caused to circulate in the manner described progressively through passages provided with numerous baffling projections, whereby the gases are retarded, more thoroughly mixed, and brought into intimate relation with large areas of incandescent surfaces, and in general to provide improvements in the construction and arrangement of the device.

This heating device may be used as a furnace or radiator and will serve for lighting purposes when proper material is used, and it may be adapted for solid or liquid fuel or gas. To these ends it is constructed to deliver supplies of properly-heated air and to mix the same with the fuel-gases at different points, which supplies are conducted to circulate through heated conduits, each conduit receiving heat from some part of the heater and discharging its air into the combustible gases in process of combustion.

The accompanying drawings illustrate the invention, of which—

Figure 4:
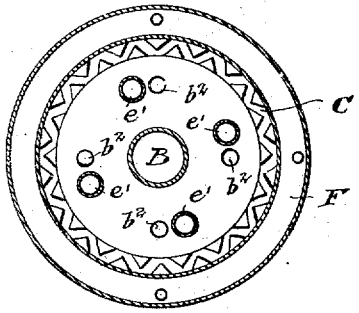
Figure 2:
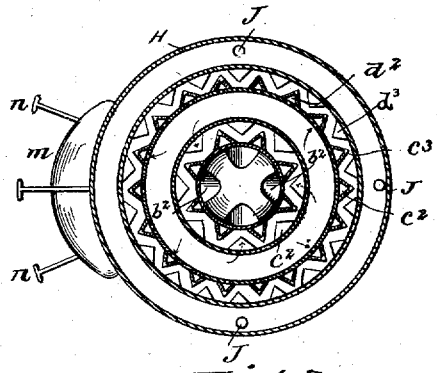
Figure 3:
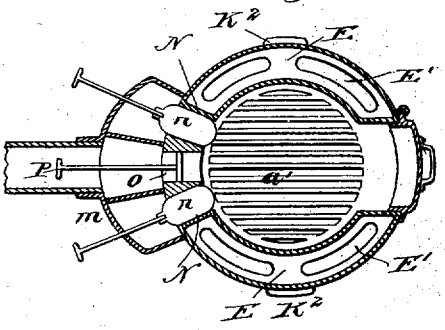

Figure 1 is a vertical section of the device, showing all the parts when in use; Fig. 2, a horizontal or cross section taken on line $x\,x$ of Fig. 1; Fig. 3, a cross-section taken on line $y\,y$, Fig. 1; and Fig. 4, a cross-section taken on line $z\,z$, looking upward, of said Fig. 1.

Viewing Fig. 1, A is a fire-pot which, as shown, is suitable for any solid fuel, but which may be adapted for liquid fuel or a gas jet or jets after the manner well known and in common use and need not be described, all of which are included under the general term of "fire-pot." It is provided with the usual grate $a'$ and an outlet for the flame and fuel-gases, (shown at $a^2$,) which are discharged into a mixing-chamber B. Within this mixing-chamber is placed a partition C, constituting a hollow annulus. This partition is located within the mixing-chamber and forming, with the walls of the latter, a circulating-passage C', through which the fuel-gases are guided and discharged into the combustion-chamber F.

A conduit for the heated air is shown at E, located adjacent to the fire-pot to receive heat therefrom. The heated air from this conduit joins the escaping products of combustion from the fire-pot at the entrance to the mixing-chamber, the resulting mixture passing into and through the circulating-passages C′ and then through a plurality of intersecting passages or flues $b^2$ into the central part of the combustion-chamber F. The hollow partition C is also supplied with heated air from the conduit E by means of a plurality of tubes $e'$, extending between the upper part of said conduit and the lower side of the hollow partition and arranged at suitable intervals apart, as best indicated in sectional Fig. 4. From the hollow partition or annulus the heated air escapes into the circulating-passages C′ at frequent intervals throughout the length of said passages through apertures or punctures $c^3$, these outlets being in the preferred construction shown herein formed through the apexes of a series of cone-shaped projections $d^2$, formed upon the exterior of the hollow partition and acting as baffles to compel the products of combustion to take a more tortuous course in passing through the circulating-passages. In order to enhance the baffling effect of the projections $d^2$, similar projections (imperforate, however) $d^3$ are arranged upon the inner walls of the mixing-chamber and desirably located in alternate relation to the projections $d^2$, as indicated clearly in the figures of the drawings. The mixing-chamber B, with its circulating-passages and hollow partition, is completely inclosed by an outer wall H, in the present instance constituting a radiating-drum and forming with the outer walls of the mixing-chamber a combustion-chamber F, which envelops and incloses the mixing-chamber, except at that side of the latter which is in juxtaposition to the fire-pot.

In the construction shown the mixing-chamber is so formed as to provide at its upper side a central cup-like depression, and within this depression is arranged to extend an open-ended flanged cup G, shaped to conform substantially to the shape of the said central depression, but of somewhat smaller dimensions, so as to form therewith an intervening annular space $g^2$, communicating with the interior of the combustion-chamber at the lower end of the conical cup G, but separated from the combustion-chamber at its outer periphery by means of the downturned portion $g'$ of the flange $g$ of the cup, which downturned portion $g'$ is connected with the outer wall of the mixing-chamber, as shown clearly in the drawings. The space $g^2$ thus formed is supplied with air through one or more inlet-tubes J, communicating with the outer atmosphere through the lower side wall of the combustion-chamber, as at $j$, and rising thence through the combustion-chamber and discharging into the space $g^2$ through the flange $g'$.

Below the fire-pot is arranged an ash-pit K, which is surrounded by an annular space or channel E′, communicating with and forming a continuation of the annular conduit E. A suitable ash-door K′ is arranged to afford communication with the ash-pit, this door being conveniently provided with the usual air-openings (not shown) and damper, whereby the supply of air to the grate is controlled. $K^2$ designates damper-doors arranged at opposite sides of the heater and controlling air-inlets $k$, which open in through the outer wall into the annular space E′, so as to afford a controlled supply of air to the air-heating conduits.

$m$ designates a revertible flue-chamber divided by means of vertical partitions $m'$ $m^2$ to form three passages or conduits, as 1, 2, and 2. The passages 2 2 lead directly from the combustion-chamber down to a chamber L, formed beneath the fire-pot, from which chamber the products of combustion return up through the central passage 1 to the chimney-opening M.

$n$ $n$ designate dampers located in passages N N, arranged to extend from the upper part of the fire-pot radially outward through the conduits E to and communicating with the respective passages 2 2, these dampers being shown clearly in Fig. 2 of the drawings in horizontal or open position. It will be understood that each damper-plate is pivotally mounted upon an axis extending transversely and centrally of the plate, so that the damper may be oscillated into vertical or horizontal position at will.

O designates a third passage similar to the passages N, affording communication between the upper part of the fire-pot and the central revertible flue 1, this passage being controlled by a damper P, constructed and arranged substantially like the dampers $n$ heretofore described.

The operation of the apparatus constructed and arranged as described is as follows: Fuel placed upon the grate $a'$ receives its initial supply of air from the ash-pit below the grate, this latter being supplied through the door K′, as hereinbefore described, and the products of combustion or combustible gases thrown off from the burning fuel rise through the restricted outlet $a^2$ of the fire-pot and pass into the circulating-passages C′, the convex portion of the centrally-depressed upper wall of the mixing-chamber serving to disperse or deflect the gases radially outward through all parts of the circulating-passages C′. At the entrance of the gases to the circulating-passages they meet supplies of heated air from the inner passages $e$, leading from the conduits E, this air being heated in its upward passage through the conduits E E′ $e$, so that it reaches the combustible gases in a comparatively hot state. The burning gases in the circulating-passages C′ pass upwardly over the upper edge of the hollow annular partition and then downwardly outside of the latter to the lower part of the mixing-chamber, from whence they are conducted to the centrally-disposed downwardly-extending portion of the combustion-chamber F through the obliquely upwardly and inwardly extending flues $b^2$, which extend from the lower part of the mixing-chamber through the entrance portions of the circulating-passages and into the space just beneath the flanged cup G. The burning gases in their passage through the circulating-passages C′ are supplied at frequent intervals with heated air from the hollow partition C through the outlets in the apexes of the several baffle projections, the hollow partition receiving its supply of heated air from the conduits E through the tubular flues $e'$. As the burning gases emerge from the flues $b^2$ they meet an additional supply of hot air from the annular space $g^2$ and, mingling with this air, pass upwardly through the cup G and disperse throughout the combustion-chamber F, the passage through said cup and the diverging passages leading therefrom, forming, in effect, circulating-passages in continuation of the passages C′, which extend along and adjacent to the entrance portions of the latter, and also serve in the present instance to completely envelop the mixing-chamber and its contained circulating-passages, except at the lower side of the mixing-chamber, which is united with the subjacent parts. From the combustion-chamber the gases pass downwardly through the revertible flues 2 2 into the chamber L beneath the ash-pit and then return upwardly through the central revertible flue 1 to the chimney M. The circulation above described is that when the device is working under normal conditions; but in case it be desired to impart a greater draft through the fuel—as, for example, when first starting the fire—the upper part of the fire-pot may be thrown into direct communication with the chimney by opening the damper P, or if a somewhat-less direct draft be wished the upper part of the fire-pot may be thrown into direct communication with the downtake-flues 2 2 by opening the dampers $n$.

An apparatus constructed in accordance with my invention operates to consume the combustible gases very perfectly, thereby affording the greatest economy of fuel and at the same time consuming the smoke very thoroughly. By reason of the peculiar construction and arrangement it will be understood that the fuel within the fire-pot first undergoes a restricted combustion, which results in distilling and throwing off the combustible gases which pass into the circulating-passages commingled with the first supply of heated air and in passing through the circulating-passages are deflected from side to side and retarded, so as to afford ample time for a more thorough combustion and so as to cause a very perfect commingling of the supplies of air therewith. The supplies of air which are added to the combustible gases while within the circulating-passages are obviously of considerably-higher temperature than the first supply, owing to the fact that the hollow partition is completely enveloped by the circulating-passages and that the combustion within the latter is much more intense and free than at the entrance to the circulating-passages, so that the cooling effect and consequent retardation of combustion due to the addition of air is minimized to the greatest extent. Likewise it will be noted that the final supply of air which is introduced through the relatively small inlet-pipes J to the narrow annular space $g^2$ will be of still higher temperature to correspond to the higher temperature of the burning gases at the point where this supply is added—namely, at the entrance to the combustion-chamber. This is due to the fact that the inlet-pipes J extend through that part of the combustion-chamber wherein the gases have reached their maximum temperature and the narrow annular space $g^2$ interposed between the combustion-chamber on the one side and the circulating-passages on the other, and is therefore subjected to a very intense heat, so that before the supply of air reaches its point of discharge it has been raised to a very high temperature. Another thing which is believed to contribute materially to the perfect combustion is the fact that the combustible gases in passing through the various circulating-passages and combustion-chamber are brought into intimate relation to extended surfaces of incandescent passage-walls, it being understood that practically the entire interior of the combustion-chamber will be at an incandescent heat during the normal operation of the device. It will be seen, therefore, that the peculiar circulation of the gases through the several combustion-spaces and the addition of the several supplies of heated air, each of successively-higher temperature, results in producing a constantly-intensified combustion, and owing to the fact that the several circulating-passages are separated from each other only by comparatively thin walls formed of material which readily conducts the heat the combustion proceeding in one part of the apparatus acts upon and augments the combustion in adjacent parts of the apparatus, to which fact I attribute largely the improved results secured. In this connection it may be explained that by the use of the term "circulate progressively" is meant a circulation which is constantly advancing toward the exit.

While I have herein described what I deem to be a preferred embodiment of my invention when used as a heating-stove, yet it will be understood that the invention may be otherwise embodied and adapted for other purposes without departing from the spirit of the invention. I do not therefore wish to be limited to the details of construction shown and described except to the extent that they are made the subject of specific claims.

I claim as my invention—

1. In a heating device, the combination of a fire-box, a circulating-passage receiving the products of combustion from the fire-box and directing them to disperse and circulate progressively around an air-heating chamber or passage so as to substantially envelop and heat the latter, a second circulating-passage, in continuation of the first-named circulating-passage, arranged to extend from a point adjacent to the receiving end of the first circulating-passage along a substantial part of the length of the latter and means for supplying heated air to said first circulating-passage at different points in the length of the latter.

2. In a heating device, the combination of a fire-box having a restricted outlet, a circulating-passage receiving the products of combustion from the fire-box and directing them to disperse and circulate progressively around an air-heating chamber or passage so as to substantially envelop and heat the latter, a second circulating-passage, arranged to extend from a point adjacent to the receiving end of the first circulating-passage along a substantial part of the length of the latter and means for supplying heated air to said first circulating-passage at different points in the latter.

3. In a heating device, the combination of a fire-box, having a restricted outlet, a circulating-passage receiving the products of combustion from the fire-box and directing them to disperse and circulate progressively around an air-heating chamber or passage so as to substantially envelop and heat the latter, a second circulating-passage, arranged to extend from a point adjacent the receiving end of the first circulating-passage along a substantial part of the length of the latter and means for supplying heated air to said first circulating-passage substantially at the entrance of the same and also from the inclosed air-heating chamber or passage.

4. In a heating device, the combination of a fire-box, a mixing-chamber in communication with the outlet of the fire-box, a hollow annulus forming an air-heating chamber arranged within the walls of said mixing-chamber and spaced therefrom, circulating-passages arranged to encircle and envelop said annulus and a combustion-chamber inclosing the mixing-chamber and constructed to receive the products of combustion from the circulating-passages of the mixing-chamber and to direct said products progressively around the exterior of the mixing-chamber, an outlet from the combustion-chamber and means for supplying heated air to the products of combustion at the entrance to the circulating-passages, from the hollow annulus at different points in said circulating-passages and at the point of entrance of the products of combustion to the combustion-chamber.

5. In a heating device, the combination of a fire-box having a single restricted outlet, a circular mixing-chamber with which said outlet of the fire-box communicates at one side and axially thereof, said mixing-chamber being provided at its side opposite its inlet with an axial cup-like recess, a hollow annulus disposed symmetrically within said mixing-chamber and supported free from the inner walls thereof so as to divide the interior of the mixing-chamber into circulating-passages enveloping said annulus, flues leading from the discharge ends of said circulating-passages through the entrance end portions of the latter and discharging into the cup-like recess outside of said mixing-chamber, a wall inclosing the mixing-chamber and forming therewith an enveloping combustion-chamber and an outlet-passage leading from the combustion-chamber, located at a point remote from the cup-like recesses forming one part of said combustion-chamber, whereby the products of combustion are caused to circulate progressively throughout the combustion-chamber, substantially as described.

6. In a heating device, the combination with a fire-box, a circulating-passage receiving the products of combustion from the fire-box and directing the main or entire volume thereof to disperse and circulate progressively around an air-heating chamber so as to substantially envelop and heat the latter, a continuation of said circulating-passage arranged to extend adjacent to and exteriorly of the receiving end of the first circulating-passage so as to envelop the exterior of the latter throughout a substantial part of its length, an air-conduit extending adjacent to the fire-box so as to receive heat therefrom, provided with outlets discharging respectively into the entrance portion of the circulating-passage and into the air-heating chamber and discharge-outlets leading from said air-heating chamber into said circulating-passage at different points.

7. In a heating device, the combination of a fire-box, having a restricted outlet, a mixing-chamber with which said outlet of the fire-box communicates at a point located centrally of one side thereof, a cup-like recess formed in the side of said mixing-chamber remote from the fire-box inlet and directly opposite the latter, a hollow annulus disposed symmetrically within said mixing-chamber and supported free from the inner walls thereof so as to divide the interior of the mixing-chamber into an annular circulating-passage enveloping said annulus and communicating with the outlet of the fire-box, intersecting flues leading from the portions of said circulating-passage remote from the entrance portion thereof through the latter and discharging into the cup-like recess outside of the mixing-chamber, a flanged cup-like member overlying the mixing-chamber and extending within the recess thereof and forming therewith an annular air-chamber in open communication with the central portion of said recess, a wall inclosing the mixing-chamber and forming therewith an enveloping combustion-chamber, one or more inlet-pipes extending freely through the combustion-chamber and supplying air to the annular space between the cup-like member and mixing-chamber, an outlet-passage leading from the combustion-chamber and an annular air-conduit surrounding the fire-pot and supplying air to said circulating-passage and to said hollow annulus, the latter being provided with a plurality of outlets discharging into the circulating-passage at different points.

8. In a heating apparatus, a fire-pot provided with an outlet into a mixing-chamber for the heat and products of combustion, means for supplying heated air at intervals to the mixing-chamber, a radiating-drum surrounding the mixing-chamber having an outlet to the chimney, and a tube as J having an inlet-aperture at the bottom of the radiating-drum, and passing up between the drum and the mixing-chamber to discharge the heated air into the space between the mixing-chamber and the walls of the drum.

9. In a heating apparatus a fire-pot provided with an outlet into a mixing-chamber, adapted to receive the products of combustion from the fire-pot, a combustion-chamber to receive the products of combustion from the mixing-chamber, a radiating-drum surrounding the mixing-chamber, in combination with means for heating and introducing a supply of air at different points into the mixing and combustion chambers, an ash-pit, a chamber below the ash-pit, and a revertible flue leading from the drum to the chamber, means for discharging the heated products through the flue into the chamber and a conduit from said chamber through the flue to the chimney substantially as described.

FRANCIS J. DOYLE.

Witnesses:

ALBERT H. GRAVES,
FREDERICK C. GOODWIN.